United States Patent Office 3,651,118
Patented Mar. 21, 1972

3,651,118
PROCESS FOR THE PREPARATION OF 1,3-CYCLO-
HEXYLENE DIISOCYANATES
Moses Cenker, Trenton, and Peter T. Kan, Livonia, Mich., assignors to BASF Wyandotte Corporation, Wyandotte, Mich.
No Drawing. Filed Feb. 5, 1969, Ser. No. 796,934
Int. Cl. C07c 119/04
U.S. Cl. 260—453 PH        13 Claims

ABSTRACT OF THE DISCLOSURE

A process for the preparation of 1,3-cyclohexylene diisocyanates in which 1,3-cyclohexanediamines are contacted with hydrogen chloride to form dihydrochloride salts which are subsequently reacted with phosgene to provide 1,3-cyclohexylene diisocyanates.

---

This invention relates to a phosgenation process for providing 1,3-cyclohexylene diisocyanates and more specifically, relates to a process for converting 1,3-cyclohexanediamines to the corresponding 1,3-cyclohexylene diisocyanates.

Processes for the phosgenation of alicyclic diamines are well known in the prior art. Two such processes are disclosed in U.S. Pat. No. 3,351,650. One process comprises the direct phosgenation of methylcyclohexane diamine in an inert solvent at an initial temperature in the range of 0° C. to 5° C. followed by further phosgenation at a temperature in the range of about 75° C. to about 140° C. The yield of the corresponding diisocyanate by this process is stated to be 21.2%. A second process disclosed in the above mentioned patent comprises reacting methylcyclohexanediamine with carbon dioxide and subsequently contacting the reaction product with phosgene, first at a temperature in the range of about 0° C. to about 5° C. and, subsequently, at a higher temperature in the range of about 75° C. to about 177° C. to obtain methylcyclohexylene diisocyanate. The only reported yields of diisocyanates obtained in this process are 16.5% and 36.0%.

It is an object of the invention to provide an economical phosgenation process for the preparation of high yields of 1,3-cyclohexylene diisocyanates. Another object of this invention is to provide a process for the preparation of high yields of 1,3-cyclohexylene diisocyanates when conducted by either batch or continuous operation. A still further object of this invention is to provide a process capable of providing high yields of 1,3-cyclohexylene diisocyanates when operated at superatmospheric pressures.

The foregoing objects and advantages, as well as others, will become apparent from the following description.

Generally speaking, the process of this invention comprises the following steps:

(a) contacting a solution of at least one 1,3-cyclohexane diamine in an inert solvent with hydrogen chloride to form the dihydrochloride salt of the diamine;
(b) contacting the reaction mixture of (a) with phosgene in a temperature range within which the phosgene reacts with the dihydrochloride salt of the diamine to form the corresponding diisocyanate; and
(c) recovering the 1,3-cyclohexylene diisocyanate product from the reaction mixture.

The 1,3-cyclohexanediamine starting material may be prepared by any suitable method as, for example, by hydrogenation of the corresponding aromatic diamine by any suitable hydrogenation reaction. Suitable hydrogenation reactions are disclosed in U.S. Pat. 2,817,444.

The 1,3-cyclohexanediamines prepared by the above described hydrogenation processes, compounds or mixtures of compounds, are represented by the following structural formula:

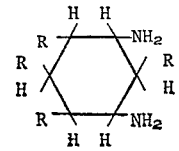

wherein each R is hydrogen or lower alkyl.

Representative 1,3-cyclohexanediamines which may be utilized in the practice of the invention include 1,3-cyclohexanediamine, 2 - methyl - 1,3 - cyclohexanediamine, 4-methyl - 1,3 - cyclohexanediamine, mixtures containing about 80% of 4-methyl-1,3-cyclohexanediamine and about 20% of 2-methyl-1,3-cyclohexanediamine and 4,5-dimethyl-1,3-cyclohexanediamine.

The 1,3-cyclohexanediamines as prepared above are then reacted with hydrogen chloride under anhydrous conditions in a suitable inert solvent within a temperature range where the dihydrochloride salt of the diamine is formed. Although the temperature utilized is not critical, it is generally employed in the range from about 0° C. to about 110° C. and preferably in the range of about 25° C. to about 35° C. The concentration of the diamine in the solvent usually is from about 5% to about 35% by weight and preferably from about 15% to about 25% by weight.

The dihydrochloride salt of the substituted diamine as prepared above is subsequently reacted with phosgene within a temperature range suitable for the formation of the corresponding 1,3-cyclohexylene diisocyanate. The temperature generally employed is from about 50° C. to about 250° C. and preferably from about 125° C. to about 185° C.

During the formation of the dihydrochloride salt of the diamine, hydrogen chloride should be supplied at a minimum ratio of about 1.1 moles of hydrogen chloride per equivalent of amine in order to produce high yields of the diisocyanate products. If less than this minimum ratio of hydrogen chloride is supplied, the diamine is not completely converted to the dihydrochloride salt and lower yields of the diisocyanate product are obtained. A greater ratio of hydrogen chloride may be used if desired to insure the presence of an excess, but generally, larger quantities are unnecessarily expensive. During the phosgenation step, the phosgene should be supplied at a rate sufficient to maintain an excess of unreacted or free phosgene in the reaction mixture to obtain high yields of the final product.

Suitable inert solvents which may be used in the practice of this invention include aromatic hydrocarbons such as benzene, toluene, xylene, cumene, cymene and the like; chlorinated aromatic hydrocarbons such as monochlorobenzene, dichlorobenzene, and trichlorobenzene and the like; saturated lower alkyl esters such as amyl acetate, ethyl caproate, methyl hexanoate, ethyl butyrate and the like. By an inert solvent is meant a solvent which is unreactive with any of the reactant materials, the dihydrochloride salt of the diamine or the final 1,3-cyclohexylene diisocyanate product.

The reaction may be carried out at either atmospheric pressure or superatmospheric pressure compatible with the particular reactants, operating conditions utilized and available processing equipment. Superatmospheric pressures of about 35 p.s.i.g. to about 250 p.s.i.g. are generally utilized for rapid operating rates and reduced apparatus size.

Representative examples of the 1,3-cyclohexylene diisocyanate final products of the invention include 1,3-cyclohexylene diisocyanate, 2-methyl-1,3-cyclohexylene diisocyanate, 4-methyl-1,3-cyclohexylene diisocyanate, 4,5-dimethyl-1,3-cyclohexylene diisocyanate, and a mixture containing about 80% 4-methyl-1,3-cyclohexylene diisocyanate and about 20% of 2-methyl-1,3-cyclohexylene diisocyanate.

The above-described process of the invention provides yields of the corresponding diisocyanates of about 90%, much greater than those obtained in either the direct or carbamic acid phosgenation of the prior art. Also, no processing difficulties are experienced in the diamine conversion to the diisocyanate. The process of this invention is capable of either batch or continuous operation. Substantially the same advantages and high yields of diisocyanates are obtained in each type of operation.

It has been reported in the literature, Annalen der Chemie, Volume 562, page 98, 1949, that aliphatic and hydroaromatic diamines are capable of phosgenation via the carbamic acid salt and render, particularly in the cyclohexane series, diisocyanates in better yields than in the application of the difficult-to-convert dihydrochlorides.

Contrary to the conclusion of the above literature report, phosgenation of the dihydrochloride salt of the cyclohexanediamines in accordance with the process of this invention provided higher yields of the diisocyanate product than the carbamic acid technique and the salts were found to be readily convertible, rather than difficult to convert. Thus, the high yields of diisocyanate obtained and simplicity of diamine conversion are entirely unexpected and surprising results of the process of the invention.

During the investigation leading to the development of the process of the invention, comparisons of various prior art processes including both the direct and the carbamic acid phosgenation of 1,3-cyclohexanediamines disclosed in U.S. Pat. No. 3,351,650 were made. Although the resultant yields of 1,3-cyclohexylene diisocyanates obtained from each process were found to be higher than those reported in the prior art, these processes inherently provided low diisocyanate yields, namely, about 50% and 75%, respectively.

Thus, the process of this invention has the advantages as compared to the above prior art processes of providing simple and substantially complete conversion of 1,3-cyclohexanediamines to their corresponding diisocyanates without formation of large amounts of undesirable by-products.

The diisocyanates provided by the invention are useful in a variety of applications, particularly in the preparation of polyurethanes, polyureas, polyurethane-polyureas, and polyamides. The diisocyanates when reacted with polyhydroxy compounds, such as polyester or polyether polyols, provide polyurethane compositions that are especially suitable for use as coatings, sealants, and elastomers.

A better understanding of the invention can be obtained by referring to the following illustrative examples which are not intended, however, to be unduly limitative of the invention.

EXAMPLE I

A solution of 50 g. (0.39 mole) of a mixture of 80% 4-methyl-1,3-cyclohexanediamine and 20% 2-methyl-1,3-cyclohexanediamine in 625 g. of xylene was charged to a reaction flask fitted with a stirrer, thermometer, water-cooled condenser and phosgene inlet tube. Anhydrous hydrogen chloride in the amount of 91 g. (2.5 moles) was bubbled into the solution during a 45-minute period with external cooling provided to maintain the temperature at 0±5° C. The resulting white suspension was allowed to warm to room temperature. Phosgene was then introduced to the mixture while heat was applied. The rate of phosgene addition was maintained at about 90 g. per hour throughout the reaction. The mixture reached the reflux temperature at 135° C. in about 25 minutes, which temperature was maintained for 14 hours. The crude product mixture was cooled while degassing with nitrogen. Solvent was removed by vacuum distillation to a temperature of 90° C. at 23 mm. Hg pressure. The remaining liquid was fractionated and a yield of 92% of a mixture containing 80% 4-methyl-1,3-cyclohexylene diisocyanate and 20% 2-methyl-1,3-cyclohexylene diisocyanate which distilled at 81° C. to 90° C. at 0.2 mm. to 0.5 mm. Hg pressure was obtained.

EXAMPLE II

This example was carried out following the procedure of Example I except that a solution of 40 g. (0.31 mole) of a mixture containing 80% 4-methyl-1,3-cyclohexanediamine and 20% 2-methyl-1,3-cyclohexanediamine in 625 g. of xylene was charged to the reaction flask and 73 g. (2.0 moles) of anhydrous hydrogen chloride were bubbled into the solution during a 30-minute period. The reaction flask was not cooled and the temperature of the mixture rose from 27° C. to 70° C. during the hydrogen chloride addition. Phosgene was then added to the resulting slurry at 70° C. while heat was applied. The temperature of the mixture reached a reflux temperature of 130° C. in about 20 minutes, which temperature was maintained for 14.5 hours. An 89% yield of a mixture containing 80% 4-methyl-1,3-cyclohexylene diisocyanate and 20% 2-methyl-1,3-cyclohexylene diisocyanate was obtained.

EXAMPLE III

The procedure of Example I was repeated using a 6.4% solution of 4,5-dimethyl-1,3-cyclohexanediamine (71.0 g. or 0.5 mole) in monochlorobenzene. The diamine was converted to the dihydrochloride and phosgenated over an 18-hour period. A yield of 4,5-dimethyl-1,3-cyclohexylene diisocyanate (180.0 g.) which distilled at 90° C. to 93° C. at 0.5 mm. pressure was obtained.

EXAMPLE IV

A solution of 156 g. (1.22 moles) of 4-methyl-1,3-cyclohexanediamine in 2400 g. monochlorobenzene (6.1 weight percent concentration) was charged to a reaction flask fitted with a stirrer, thermometer, phosgene inlet tube, and a two-stage condenser, water-cooled in the first stage and Dry Ice-cooled in the second stage. Dry hydrogen chloride in the amount of 110 g. (3.01 moles) was bubbled into the solution during a 2-hour period with external heating to maintain the temperature at about 80–100° C. Phosgene was then introduced into the amine hydrochloride suspension, rapidly at first until the system became saturated at a temperature of 120° C., and then at a rate equal to or somewhat in excess of that being consumed or required to maintain saturation as evidenced by a reflux of phosgene from the Dry Ice-cooled condenser. Heat was applied continuously, and the temperature was allowed to increase gradually while phosgene saturation was maintained until the temperature reached about 132° C. and reaction was essentially complete as evidenced by the disappearance of nearly all solids. A total of 1125 g. (11.37 moles) of phosgene was added over a period of about 18 hours. The crude product mixture was cooled while degassing with nitrogen and the solvent was distilled at reduced pressure to isolate the desired product. A 91.6% yield of 4-methyl-1,3-cyclohexylene diisocyanate was obtained.

EXAMPLE V

A solution of 156 g. (1.22 moles) of 4-methyl-1,3-cyclohexanediamine in 2400 g. monochlorobenzene (6.1 weight percent concentration) was charged to a reaction flask fitted with a stirrer, thermometer, phosgene inlet tube, and a two-stage condenser, water-cooled in the first stage and Dry Ice-cooled in the second stage. Dry hydrogen chloride in the amount of 105 g. (2.88 moles) was bubbled into the solution during a 2½ hour period with external heating to maintain the temperature at about 95–105° C. Phosgene was then introduced into the amine hydrochloride suspension, rapidly at first until the system became saturated, and then at a rate equal to or somewhat in excess of that being consumed or required to maintain saturation as evidenced by a reflux of phosgene from the Dry Ice-cooled condenser. Heat was applied to maintain a temperature of about 80–90° C. while phosgene in the amount of 400 g. (4.04 moles) was introduced in about 3 hours. The temperature was then allowed to increase gradually while phosgene saturation was maintained until the temperature reached about 132° C. and reaction was essentially complete as evidenced by the disappearance of nearly all solids, during which time an additional 680 g. (6.87 moles) of phosgene was introduced in about 19 hours. The crude product mixture was cooled while degassing with nitrogen, the solvent was distilled at reduced pressure, and the remaining liquid was fractionated at reduced pressure to isolate the desired product. A 92% yield of 4-methyl-1,3-cyclohexylene diisocyanate was obtained.

EXAMPLE VI

A solution of 156 g. (1.22 moles) of 4-methyl-1,3-cyclohexanediamine in 2400 g. of dichlorobenzene (6.1 weight percent concentration) was charged to a reaction flask fitted with a stirrer, thermometer, phosgene inlet tube, and a two-stage condenser, water-cooled in the first stage and Dry Ice-cooled in the second stage. Dry hydrogen chloride in the amount of 103 g. (2.82 moles) was bubbled into the solution during a 135-minute period with external heating to maintain the temperature at about 80–100° C. Phosgene was then introduced into the amine hydrochloride suspension, rapidly at first until the system became saturated and then at a rate equal to or somewhat in excess of that being consumed or required to maintain saturation as evidenced by a reflux of phosgene from the Dry Ice-cooled condenser. Heat was applied to maintain a temperature of about 80–90° C., while phosgene in the amount of 470 g. (4.75 moles) was introduced in about 155 minutes. The temperature was then allowed to increase gradually while phosgene saturation was maintained until the temperature reached about 180° C. and reaction was essentially complete as evidenced by the disappearance of nearly all solids, during which time an additional 497 g. (5.03 moles) phosgene was introduced in about 7¾ hours. The crude product mixture was cooled while degassing with nitrogen. The solvent was distilled at reduced pressure, and the remaining liquid was fractionated at reduced pressure to isolate the desired product. An 88% yield of 4-methyl-1,3-cyclohexylene diisocyanate was obtained.

EXAMPLE VII

A solution of 270 g. (2.11 moles) of a mixture containing 80% of 4-methyl-1,3-cyclohexanediamine and 20% of 2-methyl-1,3-cyclohexanediamine in 1230 g. of ortho-di-chlorobenzene (18 weight percent concentration) was charged to a reaction flask fitted with a stirrer, thermometer, water cooled condenser and phosgene inlet tube. Dry hydrogen chloride in the amount of 308 g. (8.44 moles) was bubbled into the solution during an 80-minute period with external cooling to maintain the temperature at 25–70° C. Phosgene was then introduced to the resulting white suspension while heat was applied. The rate of phosgene addition was 420 g./hr. for the first 65 minutes and then reduced and maintained at about 240 g. per hour, throughout the reaction. The mixture reached the reflux temperature of 163° C. in about 110 minutes which temperature was maintained for about 6 hours. The crude product mixture was cooled while degassing with nitrogen. Solvent was removed by vacuum distillation at 10 mm. pressure and the remaining liquid was fractionated to obtain the desired product. An 82% yield of a mixture containing 80% 4-methyl-1,3-cyclohexylene diisocyanate and 20% 2-methyl-1,3-cyclohexylene diisocyanates was obtained.

EXAMPLE VIII

A solution of 119 g. (0.93 mole) of a mixture containing 80% 4-methyl-1,3-cyclohexanediamine and 20% 2-methyl-1,3-cyclohexanediamine in 870 g. of a 50:50 weight mixture of monochlorobenzene and xylene (12 weight percent concentration) was charged to a reaction flask fitted with a stirrer, thermometer, water-cooled condenser and phosgene inlet tube. Dry hydrogen chloride in the amount of 136 g. (3.73 moles) was bubbled into the solution during an 80-minute period with external cooling to maintain the temperature at 25–77° C. Phosgene was then introduced to the resultant white suspension while heat was applied. The rate of phosgene addition was about 420 g./hr. for 25 minutes and then the rate of addition was reduced and maintained at about 60 g. per hour throughout the reaction. The mixture reached the reflux temperature of 131–138° C. in about 45 minutes, which temperature was maintained for about 12 hours. The crude product mixture was cooled while degassing with nitrogen and about 2 g. of insoluble material was obtained by filtering the mixture. Solvent was removed by vacuum distillation at 7 mm. pressure and the remaining liquid was fractionated. An 89% yield of a mixture containing 80% 4-methyl-1,3-cyclohexylene diisocyanate and 20% 2-methyl-1,3-cyclohexylene diisocyanate was obtained.

EXAMPLE IX

A 7.5-gallon jacketed stainless steel pressure vessel fitted with mechanical agitator and baffles, dip tube to introduce reactants below the liquid surface and a reflux condenser which in turn was connected to a scrubbing column, was charged with a solution of 1.25 lbs. (0.01 lb. mole) of a mixture of 80% 4-methyl-1,3-cyclohexanediamine and 20% of 2-methyl-1,3-cyclohexanediamine dissolved in 19.5 lbs. of xylene (weight percent solution). The solution was stirred and heated to 75° C. and 4 lbs. (0.11 lb. mole) of anhydrous HCl added in 20 minutes while cooling to maintain temperature at 75–80° C. Ten pounds (0.10 lb. mole) of phosgene was then added at 75–80° C. over a 15-minute period. The mixture was then rapidly heated to 120° C. and the bleed valve adjusted to maintain a pressure of 100 p.s.i.g. The phosgene feed rate was reduced to 2–3 lbs. per hour and maintained at this rate throughout the completion of the reaction. The reaction was completed by heating for two hours at 120° C. followed by two hours at 140° C. while maintaining the pressure at 100 p.s.i.g. The phosgene addition was then halted and the reaction mixture slowly vented to atmospheric pressure and the temperature maintained at this temperature for three hours. An 88% yield of a mixture of 80% 4-methyl-1,3-cyclohexylene diisocyanate and 20% 2-methyl-1,3-cyclohexylene diisocyanate was obtained.

The following example illustrates the low yields of 1,3-cyclohexylene diisocyanate product obtained when less than a sufficient amount of hydrogen chloride to form the dihydrochloride salt of a 1,3-cyclohexanediamine is utilized.

EXAMPLE X

A solution of 141.4 g. (1.1 moles) of a mixture of 80% 4-methyl-1,3-cyclohexanediamine and 20% 2-methyl-1,3-cyclohexanediamine in 2316 g. xylene (5.75 weight percent concentration) was charged to a reaction flask fitted with a stirrer, thermometer, phosgene inlet tube, and a two-stage condenser, water-cooled in the first stage and Dry Ice-cooled in the second stage. Dry hydrogen chloride in the amount of 45 g. (1.23 moles) was bubbled into the solution during a 1½ hour period with external heating to maintain the temperature at about 70–80° C. Phosgene was then introduced into the amine monohydrochloride suspension, rapidly at first until the system became saturated, and then at a rate equal to or somewhat in excess of that being consumed or required to maintain saturation as evidenced by a reflux of phosgene from the Dry Ice-cooled condenser. Heat was applied to maintain a temperature of about 75–90° C. while phosgene in the amount of 405 g. (4.1 moles) was introduced in about two hours. The temperature was then allowed to increase gradually while phosgene saturation was maintained until the temperature reached about 130° C. and reaction was essentially complete as evidenced by the disappearance of nearly all solids, during which time an additional 910 g. (9.2 moles) of phosgene was introduced in about 19 hours. The crude product mixture was cooled while degassing with nitrogen. The solvent was distilled off at reduced pressure, and the remaining liquid was fractionated at reduced pressure to isolate the desired product. A 62% yield of a mixture of about 80% 4-methyl-1,3-cyclohexylene diisocyanate and about 20% 2-methyl-1,3-cyclohexylene diisocyanate was obtained.

Many modifications of the embodiments of this invention and the above described preferred embodiments may be made without departing from the spirit and scope thereof and it is to be understood that the invention is not limited to the embodiments described except as defined in the appended claims.

What is claimed is:

1. A process for the preparation of 1,3-cyclohexylene diisocyanates comprising:
  (a) contacting a solution of a 1,3-cyclohexanediamine or mixtures thereof represented by the following structural formula:

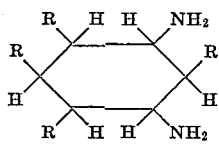

wherein each R individually is hydrogen or methyl in an inert solvent, the solution containing from about 5 to 35% by weight of diamine, with anhydrous hydrogen chloride at a temperature ranging from about 0° C. to 110° C. to form the dihydrochloride salt of the amine, the hydrogen chloride being contacted with the diamine at a rate sufficient to supply a minimum ratio of 1.1 moles of HCl per equivalent of amine;
  (b) contacting at a temperature ranging from about 50° C. to 250° C. the reaction mixture of (a) with phosgene; and
  (c) recovering the 1,3-cyclohexylene diisocyanate product from the reaction mixture.

2. A process according to claim 1 wherein the temperature of (a) ranges from about 25° C. to about 35° C.

3. A process according to claim 1 wherein the temperature of (b) ranges from about 125° C. to about 185° C.

4. A process according to claim 1 which is carried out at superatmospheric pressure.

5. A process according to claim 4 wherein the pressure ranges from about 75 p.s.i.g. to about 150 p.s.i.g.

6. A process according to claim 1 wherein the concentration of the diamine solution is from about 15% to about 25% by weight.

7. A process according to claim 1 wherein the rate of contact of the phosgene is sufficient to provide unreacted or free phosgene in the reaction mixture.

8. A process according to claim 1 wherein the inert solvent is selected from the group consisting of aromatic and chlorinated aromatic hydrocarbons, saturated lower alkyl esters, saturated alkyl ketones, and saturated alkyl ethers.

9. A process according to claim 1 wherein the inert solvent is xylene.

10. A process according to claim 1 wherein the 1,3-cyclohexylene diisocyanate product is recovered by distillation of the reaction mixture.

11. A process according to claim 1 wherein the cyclohexanediamine is 1,3-cyclohexanediamine, 2-methyl-1,3-cyclohexanediamine, 4 - methyl-1,3-cyclohexanediamine, 4,5-dimethyl-1,3-cyclohexanediamine or a mixture containing about 80% 4-methyl-1,3-cyclohexanediamine and about 20% of 2-methyl-1,3-cyclohexanediamine.

12. A process according to claim 1 wherein the cyclohexylene diisocyanate is 1,3-cyclohexylene diisocyanate, 2-methyl-1,3-cyclohexylene diisocyanate, 4-methyl-1,3-cyclohexylene diisocyanate, 4,5-dimethyl-,3-cyclohexylene diisocyanate or a mixture containing about 80% 4-methyl-1,3-cyclohexylene diisocyanate and about 20% 2-methyl-1,3-cyclohexylene diisocyanate.

13. A process according to claim 12 wherein the cyclohexylene diisocyanate is a mixture containing about 80% 4-methyl-1,3-cyclohexylene diisocyanate and 20% 2-methyl-1,3-cyclohexylene diisocyanate.

References Cited

UNITED STATES PATENTS

| | | | |
|---|---|---|---|
| 2,319,057 | 5/1943 | Hanford | 260—453 |
| 2,326,501 | 8/1943 | Siefken et al. | 260—453 |
| 2,374,340 | 4/1945 | Farlow | 260—453 |
| 3,119,856 | 1/1964 | Thomas et al. | 260—453 |
| 3,351,650 | 11/1967 | Cross et al. | 260—453 |
| 3,401,190 | 9/1968 | Schmitt et al. | 260—453 |
| 3,424,780 | 1/1969 | Sayigh | 260—453 |
| 3,484,472 | 12/1969 | Suzuki et al. | 260—453 |

ALEX MAZEL, Primary Examiner

D. H. TORRENCE, Assistant Examiner

U.S. Cl. X.R.

260—75 NT, 77.5 AT, 563 R, 563 D, 858